March 25, 1941.  E. H. AYERS  2,236,283

TIME DELAY DEVICE

Filed Sept. 16, 1939

Inventor:
Edgar H. Ayers,
by Harry E. Dunham
His Attorney.

Patented Mar. 25, 1941

2,236,283

UNITED STATES PATENT OFFICE 2,236,283

TIME DELAY DEVICE

Edgar H. Ayers, Schenectady, N. Y., assignor to General Electric Company, a corporation of New York Application September 16, 1939, Serial No. 295,314

7 Claims. (Cl. 200—97)

My invention relates to time delay devices, more particularly to electrical switching devices having a switching means operable after a predetermined time interval, and has for its object the provision of a device of this character that is rugged, reliable and inexpensive to manufacture.

In the form shown, the timing device embodying my invention is particularly useful in connection with welding machines having electric valves whose electrodes require preheating before current may safely be drawn and the machine used. Since my invention has wide application in the field of timing where timing devices characterized by simplicity of operation, long life, reliability and low manufacturing cost are desired, I do not wish to be limited in this respect.

Figure 1:
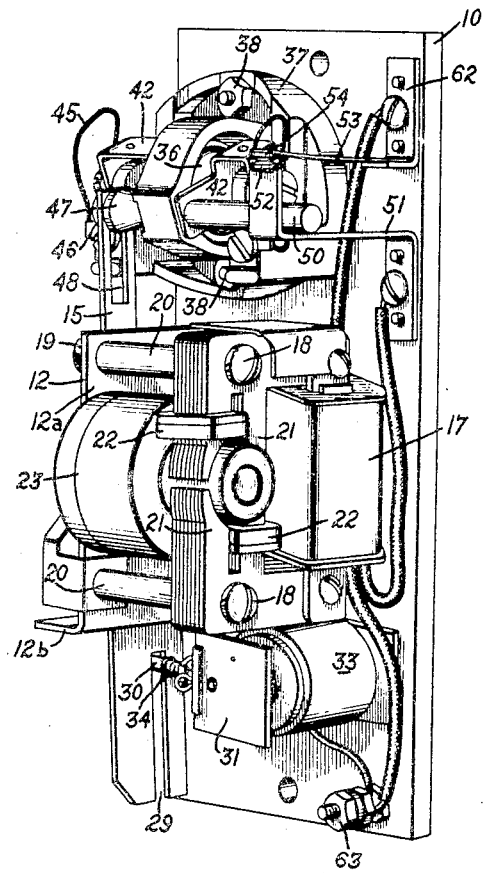
Figure 2:
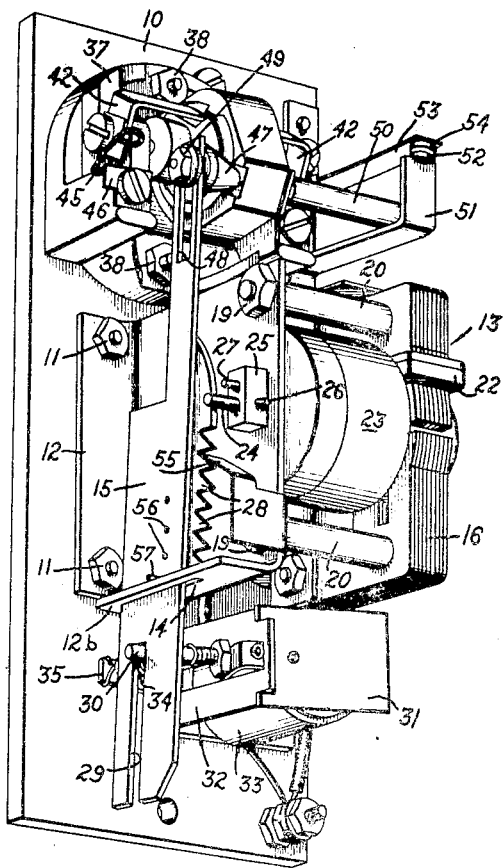
Figure 3:
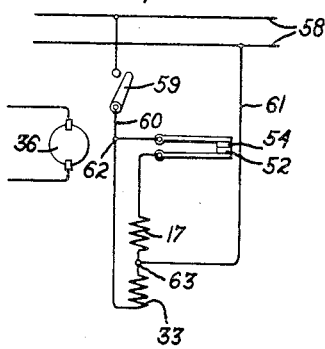
Figure 4:
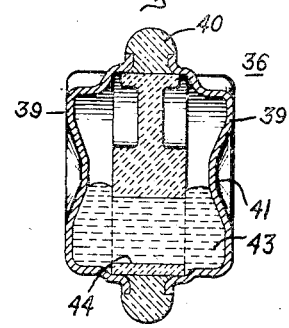

Further objects and advantages of my invention will become apparent from the following specification, and for a more complete understanding reference should be had to the accompanying drawing in which Fig. 1 is a perspective elevational view of the right-hand side of a timing device embodying my invention; Fig. 2 is a perspective elevational view similar to Fig. 1 but of the left-hand side; Fig. 3 is a diagrammatic representation of the circuit connections for the timing device illustrated in Figs. 1 and 2; and Fig. 4 is an enlarged sectional view of a mercury switch serving as the time delayed switching element for the timing device.

I have shown my invention in one form provided with a base plate 10, preferably of insulating material, upon which the various elements of the timing device are mounted. Secured to the base 10 by suitable bolts and nuts 11 is a support or bracket 12 having a main body portion 12a projecting perpendicularly from the base 10 for supporting and mounting the driving means 13 of the timing device and having a lower angular portion 12b extending at right angles both to the base 10 and to the main body portion 12a of the bracket 12. The angular portion 12b of the bracket is provided with a slot 14 for positioning and guiding the movement of a driven means, such as a rack 15, as more fully described hereinafter. The driving means 13 is preferably a constant speed electric motor, such as a small synchronous clock motor. As shown, the motor 13 is provided with a rectangular stator frame 16 of magnetizable material carrying on one leg a suitable energizing coil 17. The magnetic stator frame is secured to the main body portion 12a of the bracket 12 by means of a pair of bolts 18 and nuts 19, each of the bolts 18 being provided with a tubular spacing sleeve 20 interposed between the bracket 12 and the stator frame 16. The stator frame is provided with bifurcated pole pieces 21, one bifurcation of each of the pole pieces being provided with the respective shading windings 22. The rotor member of the motor 13 is carried within a casing 23 between the pole pieces 21, the casing having an enlarged portion forming a gear box whereby a suitable speed ratio is maintained between the rotor and a drive shaft 24 projecting through the bracket 12 above the angular portion 12b.

The extending end of the drive shaft 24 carries a driving member 25 which is secured to the shaft for rotation therewith by a pin 26, the driving member 25 also being provided with a drive pin 27 extending in parallel spaced relation to the shaft 24 and being adapted to progressively engage respective ones of the teeth 28 of the rack 15 to move the rack longitudinally upwardly in steps, or with a step-by-step movement, for each revolution of the shaft 24.

As seen in Fig. 2, the lower portion of the rack is slidable in the slot 14 which extends perpendicular to the base 10 in the angular portion 12b of the bracket 12. The slot 14 is of greater length than the width of this lower portion of the rack 15 so that the rack may be moved back and forth longitudinally of the slot into and out of operating relation with the drive pin 27 of the motor 13. The extreme lower end of the rack 15 is provided with a longitudinally extending slot 29 through which an extending arm 30 of a pivoted magnetic armature 31 projects for moving the rack 15 in the slot 14. The armature 31 is pivotally mounted on a pair of shoulders at the outer end of an L-shaped bracket 32, which is suitably secured to the base 10 and serves to mount a magnetic core member (not shown) and a potential coil 33 for the relay. A helical tension spring 34 has its ends secured respectively to the extending arm 30 and an extending member 35 of the magnetic frame 32 for biasing the armature 31 to its unattracted position away from the core member and potential coil 33. In this manner the spring 34 serves to bias the rack 15 against the back end of the slot 14, as viewed in Figs. 1 and 2, out of operating relation with the motor 13 when the potential coil 33 is de-energized.

The switching means which is operated by the rack after a predetermined upward movement of the rack under the driving force of the motor 13 includes a rotatable mercury switch 36, which is carried by a suitable insulating support 37 secured to the base 10 by the screws 38. Although any suitable electric switch may be used, a mercury switch of the type described and claimed in United States Patent 2,101,092 which issued December 7, 1937, to J. H. Payne, Jr., is preferred. Best shown in Fig. 4, briefly this switch comprises a pair of electrically conducting metal wall members 39 which are electrically insulated from one another and hermetically sealed in spaced relation by means of a relatively thin layer of glass 40 which, when fused, becomes united with the metal members. The wall members 39 are provided with concave indentations 41 so that a cylindrical container is formed which is capable of being mounted upon current supply conductors 42 having projections which engage the indented metal walls in good electrical contact. As shown in Figs. 1 and 2, the conductors 42 form a pair of bearing brackets upon which the switch may be rotated. A body of mercury 43 within the container is arranged to make and break an electrical circuit between the metal wall members 39 through a suitable aperture 44 in the glass plate 40.

As seen in Fig. 1, the mercury switch 36 is rotatably supported by the pair of conducting brackets 42 which are mounted for rotation on the insulating support 37. Each of the conducting brackets 42 is connected by a flexible conductor 45 to the respective terminals 46 through which the mercury switch is connected in the circuit to be controlled (not shown). At the left-hand side of the rotating mercury switch 36 is a projecting member 47 having a portion extending through a longitudinal slot 48 in the upper end of the rack 15. The extreme left end of the projection 47 is provided with a nut 49 arranged so that the rack is readily slidable with respect to the projection 47, thus enabling the mercury switch 36 to remain immovable until the projection 47 is engaged either by the upper or lower end of the slot 48. In this manner a lost motion connection is formed between the rack 15 and the mercury switch 36 so that the rack may be moved upwardly a predetermined amount before causing movement and operation of the mercury switch 36. At the right-hand side of the mercury switch is an extending arm 50 of insulating material having its end positioned between a bracket 51 supporting a relatively fixed contact 52 and a resilient strip 53 supporting a relatively movable contact 54 normally biased into engagement with the fixed contact 52. Since the projection 47 and the extending arm 50 on the mercury switch 36 are positioned away from the center of rotation, the weight of these elements causes the mercury switch to be gravity biased for rotation to its "off" or circuit-disengaged position, the extending arm 50 resting against the bracket 51 and preventing further rotation of the switch in that direction. The projection 47 on the mercury switch serves also as a pivot about which the rack 15 is swung into and out of operating relation with the driving pin 27. The rotation of the rack 15 about the projection 47 is, of course, limited within the confines of the slot 14.

Secured by the lower one of the bolts 18 is a spring detent 55 having an extending end adapted to engage the respective ones of the teeth 28 of the rack 15 when it is in the operating position during the progressively upward movement by the driving pin 27 to prevent the rack from falling back to its former or starting position, the rack itself being gravity biased to the lowest position. In order to adjust or pre-set the starting position of the rack, there are provided a series of spaced apertures 56 into which a pin 57 can be inserted, as seen in Fig. 2. The lowest position of the rack obtains when the pin 57 engages the angular portion 12b of the bracket 12 and prevents further downward movement of the rack. As will become more fully apparent hereinafter, the time delay setting of the device is adjustable by changing the starting position of the rack. This has the effect of lengthening or shortening the slot 48 with respect to the position of the projection 47 on the mercury switch 36 and so varies the length of the path of travel before the switch 36 is operated.

The circuit connections of the above described timing device will be best understood in connection with the circuit diagram of Fig. 3. The timing device is supplied from a suitable source of alternating current 58 through a manual switch 59 (not shown in any of the other figures) by the conductors 60 and 61 respectively leading to the terminals 62 and 63, which as shown in Fig. 1 are mounted on the base 10. The operating winding 17 of the motor 13 and the potential coil 33 of the relay comprise a pair of parallel circuits connected between the terminals 62 and 63. Connected in series circuit with the motor winding 17 are the fixed and movable contacts 52 and 54 which constitute an independent switch for de-energizing only the motor 13 simultaneously with the operation of the mercury switch 36 without affecting the potential coil 33 of the rack relay. The mercury switch 36 is shown in Fig. 3 as an independent switching unit for any suitable circuit to be controlled.

In operation of the timing device it is desired to actuate the mercury switch 36 a predetermined time after the timing device is first started. As previously mentioned, one of the various applications in which a timer of this character is useful is in connection with welding machines, the output circuit of the machine being maintained disconnected for a predetermined time during the necessary heating of the electric valves or discharge devices therein.

As shown in Figs. 1, 2 and 3, the timing device is in the reset or starting position ready for operation by closure of the switch 59. At this time, the spring 34 biases the rack 15 against the back end of the slot 14 out of operating relation with the drive pin 27 of the motor 13 and out of engagement with the spring detent 55. Closure of the switch 59 energizes both the relay coil 33 and the motor winding 17, this latter through the normally closed contacts 52 and 54. Immediately, the armature 31 is pulled inwardly toward the core of the relay and also the motor 13 is started. Movement of the armature 31 pulls the rack 15 forward in the guide slot 14 into engagement with the spring detent 55 and ready to be engaged and driven upwardly by the moving drive pin 27. Meanwhile the mercury switch 36 is gravity biased to the "off" position shown, the projection 47 acting as a pivot about which the rack is rotated and later guided during its initial upward movement.

For each revolution of the drive shaft 24 of the motor 13, the drive pin 27 engages an adjacent one of the rack teeth 28 and the rack is advanced step by step. During each advance, the spring detent 55 engages the bottom of the next lower tooth from that previously engaged and so retains the rack in its advanced position. During its upward movement, the rack 15 is guided by the forward end of the slot 14, the spring biased arm 30 in the slot 29 and by the projection 47 in the slot 48. Thus, the rack 15 is easily maintained in the proper operating position during its movement.

Finally after a predetermined travel, the lower end of the slot 48 reaches the projection 47 and the mercury switch 36 is given a rotary motion to the "closed" or "on" position. Preferably this motion consumes two revolutions of the driving shaft 24 in order to give an ample closing movement to the mercury switch before the movable contact 54 is disengaged from the fixed contact 52 by the arm 50. Thus, with the mercury switch 36 fully operated, the motor 13 is de-energized by the opening of the contacts 52 and 54. The relay potential coil 33 remains energized, however, and continues to hold the rack 15, the mercury switch 36 and the contacts 52 and 54 in the operated position. Operation of the mercury switch 36, of course, completes or energizes the controlled circuit, this a predetermined time after closure of the switch 59.

To reset the timing device, the switch 59 (shown in Fig. 3) is opened. This de-energizes the relay coil 33, and the spring 34 pivots the armature 31 and its operating arm 30 to move the rack 15 pivotally about the projection 47 toward the back end of the slot 14. This, of course, frees the teeth 28 from the drive pin 27 and spring detent 55, the rack falling back to its starting position determined by the engagement of the bracket 12b and the pin 57. The rack 15 is guided during its return movement by the slot 14, the projection 47 and the arm 30. Simultaneously, the gravity biased mercury switch 36 and its contact operating arm 50 rotate back to their respective initial positions determined by the contact support 51 which engages the arm 50.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A time delay device comprising a base, switching means including an electrical switch mounted on said base, a driving motor supported by said base, guide and support means on said base including a bracket provided with a slot, a rack arranged for longitudinal movement by said motor and having a portion slidable in said slot during said movement, a lost motion connection between said rack and said switch including a projection on one of said parts whereby said switch is operated by said rack after a predetermined movement thereof, said projection serving as a pivot about which said rack is movable into and out of operating relation with said motor, means including a magnetic armature for pivoting said rack, said slot in said bracket being arranged for guiding said rack during the pivotal movement thereof into said operating relation with said motor and during the longitudinal movement of said rack.

2. A time delay device comprising a base of insulating material, switching means including a rotatable switch mounted on said base, a constant speed electric motor, a bracket mounting said motor on said base and having an angular portion provided with a slot, a rack arranged for step-by-step longitudinal movement by said motor and having a portion slidable in said slot during said movement, a lost motion connection between said rack and said switch including a projection from one of said parts whereby said switch is operated by said rack after a predetermined movement thereof, said projection serving as a pivot about which said rack is movable into and out of operating relation with said motor, means including a magnetic armature for pivoting said rack, said slot in said bracket being arranged for guiding said rack during the pivotal movement of said rack into said operating relation with said motor and for guiding said rack during said longitudinal movement thereof.

3. A time delay device comprising a base of insulating material, switching means including a rotatable switch mounted on said base, a constant speed electric motor, a bracket mounting said motor on said base and having an angular portion provided with a slot, a rack arranged for step-by-step longitudinal movement by said motor and having a portion slidable in said slot during said movement, a lost motion connection between said rack and said switch including a projection on said switch and a slot in said rack whereby said switch is operated by said rack after a predetermined movement thereof, said projection serving as a pivot about which said rack is movable into and out of operating relation with said motor, means including a magnetic armature for pivoting said rack, said slot in said bracket being longer than the width of the rack therein for limiting the pivotal movement of said rack into said operating relation with said motor, one end of said slot in said bracket and said lost motion connection guiding said rack during said longitudinal movement thereof.

4. A time delay device comprising a base of insulating material, switching means including a rotatable mercury switch mounted on said base, a constant speed electric motor, a bracket mounting said motor on said base and having an angular portion provided with a slot, a rack arranged for step-by-step longitudinal movement by said motor and having a portion slidable in said slot during said movement, a lost motion connection between said rack and said mercury switch including a projection from one of said parts whereby said mercury switch is operated by said rack after a predetermined movement thereof, said projection serving as a pivot about which said rack is movable into and out of operating relation with said motor, means including a magnetic armature for pivoting said rack, said slot in said bracket being longer than the width of said rack therein for limiting the pivotal movement of said rack into said operating relation with said motor and for guiding said rack during said longitudinal movement thereof, switching means for de-energizing said motor when said mercury switch is operated including an arm on said mercury switch, a fixed contact and a relatively movable contact operable by said arm to disengage said contacts.

5. A time delay device comprising a base of insulating material, switching means including a rotatable switch mounted on said base, an electric driving motor, a bracket mounting said motor on said base and having an angular portion provided with a slot, a rack provided with teeth and arranged for step-by-step longitudinal movement by said motor and having a portion slidable in said slot during said movement, spring means carried by said bracket and arranged to progressively engage said teeth on said rack during said step-by-step movement thereof by said motor, a lost motion connection between said rack and said switch including a projection from one of said parts whereby said switch is operated by said rack after a predetermined movement thereof, said projection serving as a pivot about which said rack is movable into and out of operating relation with said motor, means including a magnetic armature for pivoting said rack, said slot in said bracket being longer than the width of said portion of said rack slidable therein for limiting the pivotal movement of said rack into and out of said operating relation with said motor and said spring means and for guiding said rack during said longitudinal movement thereof by said motor.

6. A time delay device comprising a base of insulating material, switching means including a rotatable switch mounted on said base and gravity biased to a predetermined position, a constant speed electric motor, a bracket mounting said motor on said base and having an angular portion provided with a slot, a rack arranged for step-by-step longitudinal movement by said motor and having a portion slidable in said slot during said movement, a lost motion connection between said rack and said switch including a projection from one of said parts whereby said switch is operated by said rack after a predetermined movement thereof, said projection serving as a pivot about which said rack is movable into and out of operating relation with said motor, means including a spring biased magnetic armature having a portion engaging a slot in said rack for pivoting said rack, said armature when energized serving to move said rack into operating relation with said motor and when de-energized serving to disengage said rack from said motor whereby said rack is lowered by gravity to a reset position, said slot in said bracket being longer than the width of said rack therein for limiting the pivotal movement of said rack into and out of operating relation with said motor and for guiding said rack during said longitudinal movement thereof, said rack being biased by said armature against the respective ends of said slot during the movement of said rack in either direction between its lower and upper positions.

7. A time delay device comprising a base of insulating material, switching means including a rotatable mercury switch mounted on said base, a constant speed electric motor, a bracket mounting said motor on said base and having an angular portion provided with a slot, a rack arranged for step-by-step longitudinal movement by said motor and having a portion slidable in said slot during said movement, a lost motion connection between said rack and said mercury switch including a projection from one of said parts whereby said mercury switch is operated by said rack after a predetermined movement thereof, said projection serving as a pivot about which said rack is movable into and out of operating relation with said motor, means including a magnetic armature for pivoting said rack, said slot in said bracket being longer than the width of said rack therein for limiting the pivotal movement of said rack into said operating relation with said motor and for guiding said rack during said longitudinal movement thereof, switching means for de-energizing said motor when said mercury switch is operated including an arm on said mercury switch, a fixed contact and a relatively movable contact operable by said arm to disengage said contacts, and a support for said fixed contact mounted on said base, said arm on said mercury switch engaging said support to thereby determine the initial position of said mercury switch.

EDGAR H. AYERS.